United States Patent
Chen et al.

(10) Patent No.: US 11,265,303 B2
(45) Date of Patent: *Mar. 1, 2022

(54) STATELESS SESSION SYNCHRONIZATION BETWEEN SECURE COMMUNICATION INTERCEPTORS

(71) Applicant: International Business Machines Corporation, Armonk, NY (US)

(72) Inventors: Kuo-Chun Chen, New Taipei (TW); Wei-Hsiang Hsiung, Taipei (TW); Cheng-Ta Lee, Taipei (TW); Wei-Shiau Suen, Taichung (TW); Ming Hsun Wu, New Taipei (TW)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/834,529

(22) Filed: Mar. 30, 2020

(65) Prior Publication Data

US 2020/0228513 A1 Jul. 16, 2020

Related U.S. Application Data

(63) Continuation of application No. 15/832,168, filed on Dec. 5, 2017, now Pat. No. 10,652,224.

(51) Int. Cl.
*H04L 29/06* (2006.01)
*H04L 9/08* (2006.01)
(Continued)

(52) U.S. Cl.
CPC .......... *H04L 63/067* (2013.01); *H04L 9/0825* (2013.01); *H04L 9/0841* (2013.01);
(Continued)

(58) Field of Classification Search
CPC ....... H04L 63/067; H04L 9/12; H04L 9/0841; H04L 9/0861; H04L 67/141; H04L 9/0825; H04L 9/30; H04L 63/30; H04L 63/166; H04L 2463/061; H04L 63/061; H04L 63/0442
See application file for complete search history.

(56) References Cited

U.S. PATENT DOCUMENTS 9,565,020 B1 * 2/2017 Camenisch ......... H04L 63/0815
2004/0103283 A1 * 5/2004 Hornak ................ H04L 63/166
713/175

(Continued)

OTHER PUBLICATIONS

Dec. 5, 2017, U.S. Appl. No. 15/832,168, 2019/0173863.

*Primary Examiner* — Abu S Sholeman
(74) *Attorney, Agent, or Firm* — Troutman Pepper Hamilton Sanders LLP

(57) ABSTRACT

Embodiments provide a system and method for stateless session synchronization between inspectors for high availability deployments. Man in the Middle inspectors of a communication session between a client and server exchange a shared key that is used as a common seed value in a mapping function algorithm. Each inspector generates identical key-pairs using the common mapping function algorithm, and the inspectors generate the session keys from the key-pairs. Inspectors use the session keys to decrypt and either actively or passively inspect data transferred in a session between a client and server.

16 Claims, 6 Drawing Sheets

(51) Int. Cl.
*H04L 67/141* (2022.01)
*H04L 9/12* (2006.01)
*H04L 9/30* (2006.01)

(52) U.S. Cl.
CPC .............. *H04L 9/0861* (2013.01); *H04L 9/12* (2013.01); *H04L 67/141* (2013.01); *H04L 9/30* (2013.01); *H04L 63/30* (2013.01)

(56) References Cited

U.S. PATENT DOCUMENTS

| | | | |
|---|---|---|---|
| 2007/0257813 A1* | 11/2007 | Vaswani | G01D 4/004 340/870.02 |
| 2008/0114982 A1 | 5/2008 | Bleumer et al. | |
| 2013/0191627 A1 | 7/2013 | Ylonen et al. | |
| 2013/0195274 A1* | 8/2013 | Nakashima | H04L 9/3066 380/282 |
| 2014/0095865 A1* | 4/2014 | Yerra | H04L 63/0823 713/156 |
| 2015/0254463 A1* | 9/2015 | Ryhorchuk | H04L 63/0442 713/156 |
| 2017/0019387 A1 | 1/2017 | Ylonen | |
| 2017/0142100 A1 | 5/2017 | Bollay et al. | |
| 2018/0160255 A1 | 6/2018 | Park | |
| 2018/0337782 A1* | 11/2018 | Wu | H04L 9/0836 |
| 2018/0351997 A1* | 12/2018 | Lee | H04L 67/42 |
| 2020/0090147 A1* | 3/2020 | Cole | G06Q 20/108 |

\* cited by examiner

STATELESS SESSION SYNCHRONIZATION BETWEEN SECURE COMMUNICATION INTERCEPTORS

CROSS-REFERENCE TO RELATED APPLICATIONS

This application is a continuation of U.S. patent application Ser. No. 15/832,168, filed on Dec. 5, 2017, entitled "Stateless Session Synchronization Between Secure Communication Interceptors," the entire contents of which are hereby incorporated by reference herein.

BACKGROUND

The present application relates generally to security in computer networks and computing systems, and more particularly, but not exclusively, to the inspection of encrypted data in high availability deployments.

An increasing number of computer applications use a secure connection between clients and servers on computer networks, such as the Internet. Numerous communication protocols exist to provide secure connections. For example, Secure Sockets Layer (SSL) and Transport Layer Security (TLS) can provide secure communications. The Institute of Electrical and Electronics Engineers (IEEE) deprecated SSL in favor of TLS.

TLS provides a secure connection because it encrypts the data being sent between the client and the server during a communication session. Although the connection may be secure, if the connection is to a malicious server, then the network could be exposed to dangerous viruses, trojans, or network attacks hidden in the encrypted data. Therefore, enterprises need to perform network inspection or monitoring of the encrypted traffic on the secure links to inspect for malicious data. To inspect encrypted traffic, there needs to be a means to decrypt the data payload, such as obtaining the private key used for encryption/decryption by the sender/receiver. For example, with TLS connections prior to TLS release 1.3, servers often used RSA certificates to perform key exchanges with the client, and "inspectors" used the private key from the server's RSA certificate to decrypt the payload data for inspection. As used herein, an "inspector" refers to software, hardware, and/or a combination of hardware and software configured to receive data, decrypt the data, examine the data for malicious content, extract or neutralize any malicious content in the data, encrypt non-malevolent data, and transmit encrypted data.

The use of RSA certificates presents a weakness in security because if the server's RSA private key is compromised then all TLS communications to that server can be decrypted. This includes traffic that may have been captured in the past. For instance, if a malicious party captured traffic to a server for three years and at the end of this time obtained the RSA certificate, then the malicious party could decrypt all of that traffic.

To eliminate this weakness, TLS release 1.3 deprecates the use of RSA in order for TLS release 1.3 to provide "Perfect Forward Secrecy" in which each key is valid only for one session. Because TLS 1.3 does not use RSA, inspectors require an alternative means for decrypting the payload. Man-in-the-middle ("MitM") inspection offers one such alternative. In MitM inspection, an inspector intercepts the client's connection to a server, establishes the connection to the server on the client's behalf, decrypts the data, inspects the data, and then re-encrypts the data for transport to the client.

In High Availability ("HA") deployments of network connectivity in which a high level of operational performance is required, multiple MitM inspectors may be needed to inspect a single secure communications session. This becomes problematic because the inspection states must be synchronized between inspectors so that all inspectors for a given communication session use the same keys for encrypting/decrypting. This is true whether the deployment of inspectors is in the active-active or active-passive inspection format.

Mechanisms to synchronize the inspection states between inspectors, including the session data and session keys are extremely complex, error-prone, and they create new race conditions between inspectors.

SUMMARY

Embodiments of the invention provide a computer implemented method in a data processing system comprising a processor and a memory comprising instructions, which are executed by the processor to cause the processor to implement a system for providing stateless synchronization, the method receiving, by a first inspector, a first set of key parameters associated with a communication session; generating, by the first inspector, a first key-pair using the first set of key parameters and a shared key; receiving, by the first inspector, a second set of key parameters associated with the communication session; and generating, by the first inspector, a second key-pair using the second set of key parameters and the shared key.

Embodiments can further provide a method comprising exchanging the shared key between the first inspector and a second inspector.

Embodiments can further provide a method comprising wherein receiving, by the second inspector, the first set of key parameters; generating, by the second inspector, a third key-pair using the first set of key parameters and the shared key, wherein the first key-pair and the third key-pair are identical; receiving, by the second inspector, the second set of key parameters; and generating, by the second inspector, a fourth key-pair using the second set of key parameters and the shared key, wherein the second key-pair and the fourth key-pair are identical.

Embodiments can further provide a method comprising wherein the first inspector generates a private key for the first key-pair using a first hash function of at least one received key parameter from the first set of key parameters and the shared key; wherein the first inspector generates a private key for the second key-pair using a second hash function of at least one received key parameter from the second set of key parameters and the shared key; wherein the second inspector generates a private key for the third key-pair using a third hash function of at least one received key parameter from the first set of key parameters and the shared key; and wherein the second inspector generates a private key for the fourth key-pair using a fourth hash function of at least one received key parameter from the second set of key parameters and the shared key.

Embodiments can further provide a method comprising wherein the first inspector generates a public key for the first key-pair; wherein the first inspector generates a public key for the second key-pair; wherein the second inspector generates a public key for the third key-pair; and wherein the second inspector generates a public key for the fourth key-pair.

Embodiments can further provide a method comprising generating, by the first inspector, a first pre-master-secret using at least one key from the first key-pair; generating, by the first inspector, a second pre-master-secret using at least one key from the second key-pair; generating, by the second inspector, a third pre-master-secret using at least one key from the third key-pair, wherein the first and third pre-master-secrets are identical; and generating, by the second inspector, a fourth pre-master-secret using at least one key from the fourth key-pair, wherein the second and fourth pre-master-secrets are identical.

Embodiments can further provide a method comprising generating, by the first inspector, a first session key using the first pre-master-secret; generating, by the first inspector, a second session key using the second pre-master-secret; generating, by the second inspector, a third session key using the third pre-master-secret, wherein the first session key and the third session key are identical; and generating, by the second inspector, a fourth session key using the fourth pre-master-secret, wherein the second session key and the fourth session key are identical.

Embodiments can further provide a method comprising wherein the shared key is exchanged between the first inspector and the second inspector according to a predefined frequency.

Embodiments can further provide a method comprising wherein the communication session is a Transport Layer Security (TLS) session between a client and a server.

Embodiments can further provide a method comprising wherein the first, second, third, and fourth key-pairs are each valid only for the communication session.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of embodiments of the present invention are best understood from the following detailed description when read in connection with the accompanying drawings. For the purpose of illustrating the invention, there is shown in the drawings embodiments that are presently preferred, it being understood, however, that embodiments of the invention are not limited to the specific instrumentalities disclosed. Included in the drawings are the following Figures.

DETAILED DESCRIPTION

Figure 1:
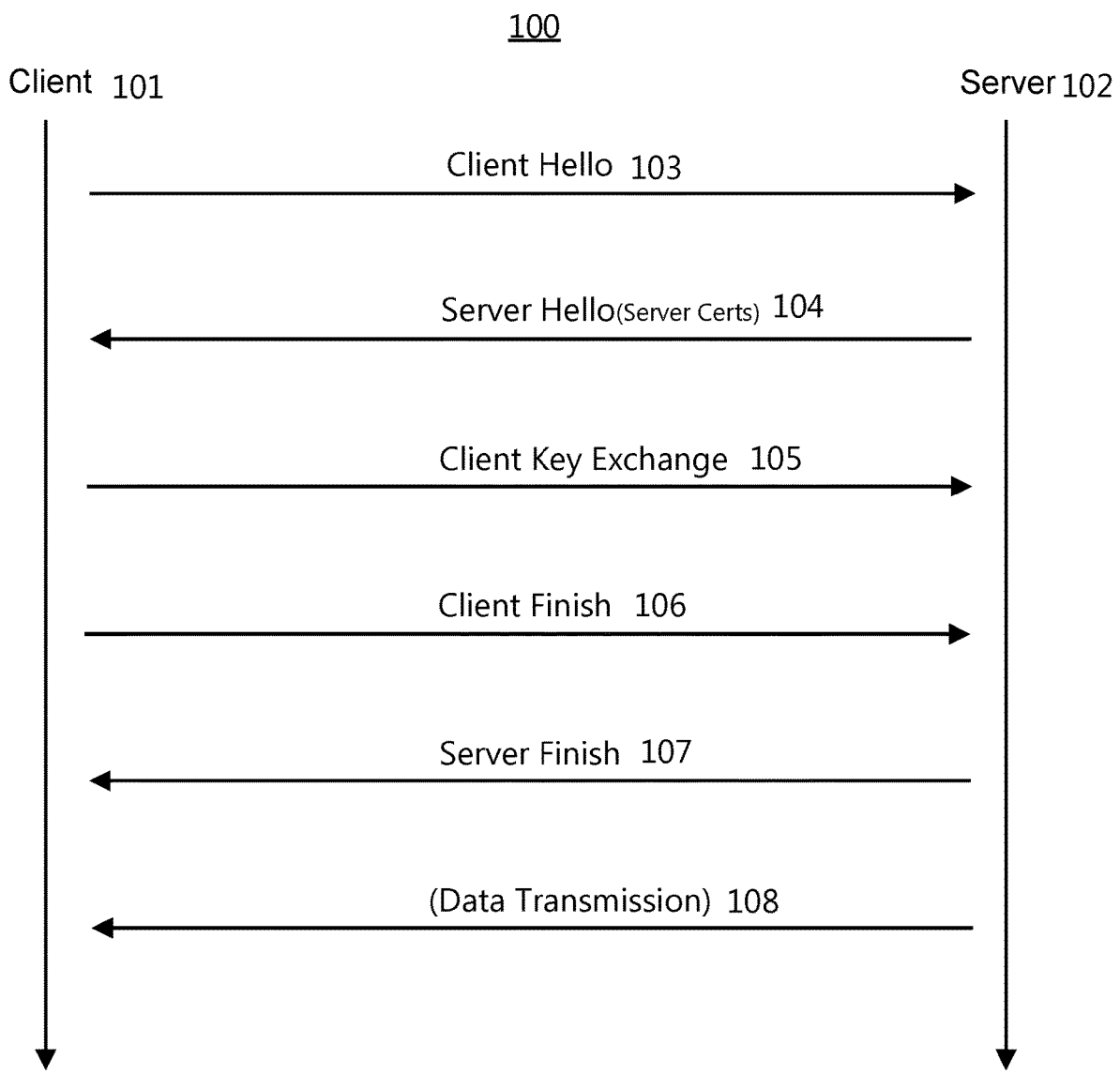
FIG. 1 depicts the TLS handshake process without an inspector.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates an exemplary TLS handshake process 100 that takes place in a TLS session over a network between a client device 101, such as a user's computer, and a server device 102, such as a bank's server. It should be understood that a TLS session may be established between virtually any network devices enabled to employ the TLS protocol. Furthermore, a TLS session may employ one or more underlying network connections. Either a client or a server may initiate a TLS connection once a TLS session has been established. Reference to the TLS connection refers to the physical communication channel(s) used to transport data. Reference to the TLS session refers to a temporal unit of context and continuity associated with a communication between client and server that may be associated with cryptography parameters. There can be multiple connections associated with one session. It is not uncommon for browsers to open and use several connections simultaneously in a session. Furthermore, a connection can be closed, but a session can be maintained and even stored for subsequent resumption using another connection. Conversely, a TLS session can be renegotiated without interrupting the established connection.

Regardless of which device initiates the TLS connection, handshaking between the client 101 and server 102 begins to initiate the TLS session. Handshaking mutually determines the secret keys used by the client 101 and server 102 in the bulk encryption/decryption of data between them. The keys are established using public key cryptography, such as Diffie-Hellman, that allows the client 101 and the server 102 to share a secret over a non-secure channel.

In an embodiment, the client 101 sends a client hello message 103 to the server 102 that lists cryptographic information such as the TLS version and the encryption protocols, such as Diffie-Hellman Ephemeral (DHE), supported by the client 101 for exchanging key information. The client hello message 103 also contains a random byte string used in subsequent calculations. Other optional information may also be sent by the client 101.

The server 102 responds with a server hello message 104. The server hello message 104 contains the encryption protocols chosen by the server 102 from the list provided by the client 101 in the client hello message 103. The server 102 also includes in the server hello message 104 the session ID and another random byte string. Other optional data may also be sent by the server 102, such as the server certificate.

The client 101 uses the randomly generated data exchanged in the client hello 103 and the server hello 104 messages to generate a pre-master-secret for a TLS session. In step 105, the client 101 sends the server 102 the pre-master-secret, and in one embodiment, the pre-master-secret may be encrypted using a public key associated with the server 102 obtained from the server hello message 104. From the pre-master-secret, both the client 101 and the server 102 generate a master secret, which is also known as a session key. The session key is a symmetric key used for bulk encryption/decryption by the client 101 and the server 102.

In step 106, the client 101 sends the server 102 a finished message, which is encrypted with the session key, indicating that the client part of the handshake is complete. In step 107, the server 102 sends the client 101 a finished message, which is also encrypted with the session key, indicating that the server part of the handshake is complete.

In step 108, the client 101 and the server 102 use their respective instances of the session key(s) to generate and send messages containing encrypted payloads. The client 101 and server 102 can exchange encrypted data for the duration of the session. The client 101 and server 102 also use the session key(s) to decrypt received payloads. Any subsequent session requires another set of handshaking to derive a new set of keys.

Figure 2:
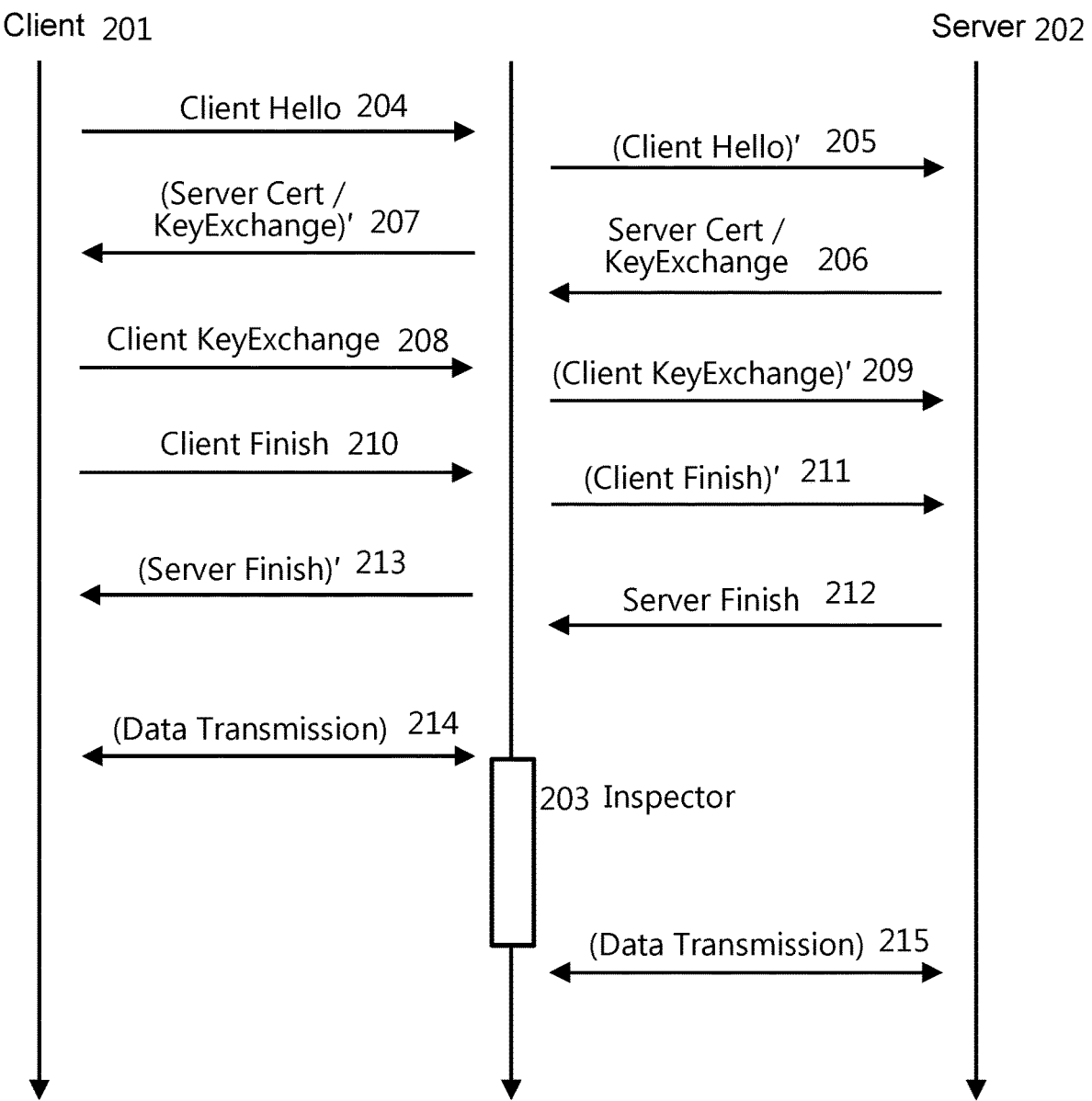
FIG. 2 depicts MitM inspection.

FIG. 2 illustrates exemplary Man in the Middle (MitM) inspection of a TLS connection. The purpose of a MitM inspection is to separate the session between the client 201 and the server 202 into two sessions: one session between the inspector 203 and the client 201; and a second session between the inspector 203 and the server 202. This enables the inspector 203 to establish a session key with the server 202 and a session key with the client 201 so that the inspector 203 can decrypt data from either the server 202 or the client 201, inspect the data, and then encrypt the data to pass the data along to its intended destination. The process will be explained in more detail with respect to FIG. 2 below. If inspector 203 were unable to insert itself in the session handshaking between the client 201 and the server 202, the inspector 203 would not be able to obtain the session key(s) between the client 201 and server 202 that would be needed to inspect the payload.

Referring to FIG. 2, the TLS session handshaking begins with the client hello message 204. The client 201 sends the client hello message 204 to open a TLS session. In MitM inspection, the client hello message 204 is received by the inspector 203 instead of the server 202. The MitM inspector 203 intercepts the client hello message 204 in order to establish a first session between the client 201 and inspector 203. To open a second session between the inspector 203 and server 202, the inspector 203 sends a "fake" client hello message 205 to the server 202. The client hello message 204 and "fake" client hello message 205 include the cryptographic information described above such as the TLS version, encryption protocols, a random byte string used in subsequent calculations, and other optional information.

The server 202 responds with a server hello message 206 that is received by the inspector 203 instead of the client 201. The inspector 203 sends a "fake" server hello message 207 to the client 201. The server hello message 206 and "fake" server hello message 207 include the selected encryption protocols, the session ID, another random byte string, and any other optional data.

When the client 201 receives the "fake" server hello message 207, the client 201 uses the information in the "fake" server hello message 207 to generate a pre-master-secret, and the client 201 sends this pre-master-secret to the inspector 203 in step 208. With the pre-master-secret, the client 201 and inspector 203 are able to generate a session key to exchange encrypted data.

The inspector 203 then sends a pre-master-secret to the server 202 in step 209. With this pre-master-secret, the inspector 203 and server 202 can generate a session key to exchange encrypted data.

After the key exchanges, the client 201 sends a client finish message 210 that is received by the inspector 203. The inspector 203 sends a "fake" client finish message 211 to the server 202. The server 202 sends a server finish message 212 that is received by the inspector 203. The inspector 203 sends a "fake" server finish message 213 that is received by the client 201.

At this point data can be exchanged between the client 201 and inspector 203 in step 214. The inspector 203 uses the session key created during the handshaking between the client 201 and inspector 203 to decrypt the data from the client 201 and inspect the data. After the inspection, all approved data is encrypted by the inspector 203 with the session key created during the handshaking with the server 202. The inspector 203 sends the data to the server 202 in step 215. Likewise, data received by the inspector 203 from the server 202 is decrypted by the session key generated through the handshaking between the inspector 203 and server 202. The inspector 203 inspects this data, and all approved data is sent to the client 201 after the data is encrypted with the session key generated through the handshaking between the client 201 and inspector 203.

Figure 3:
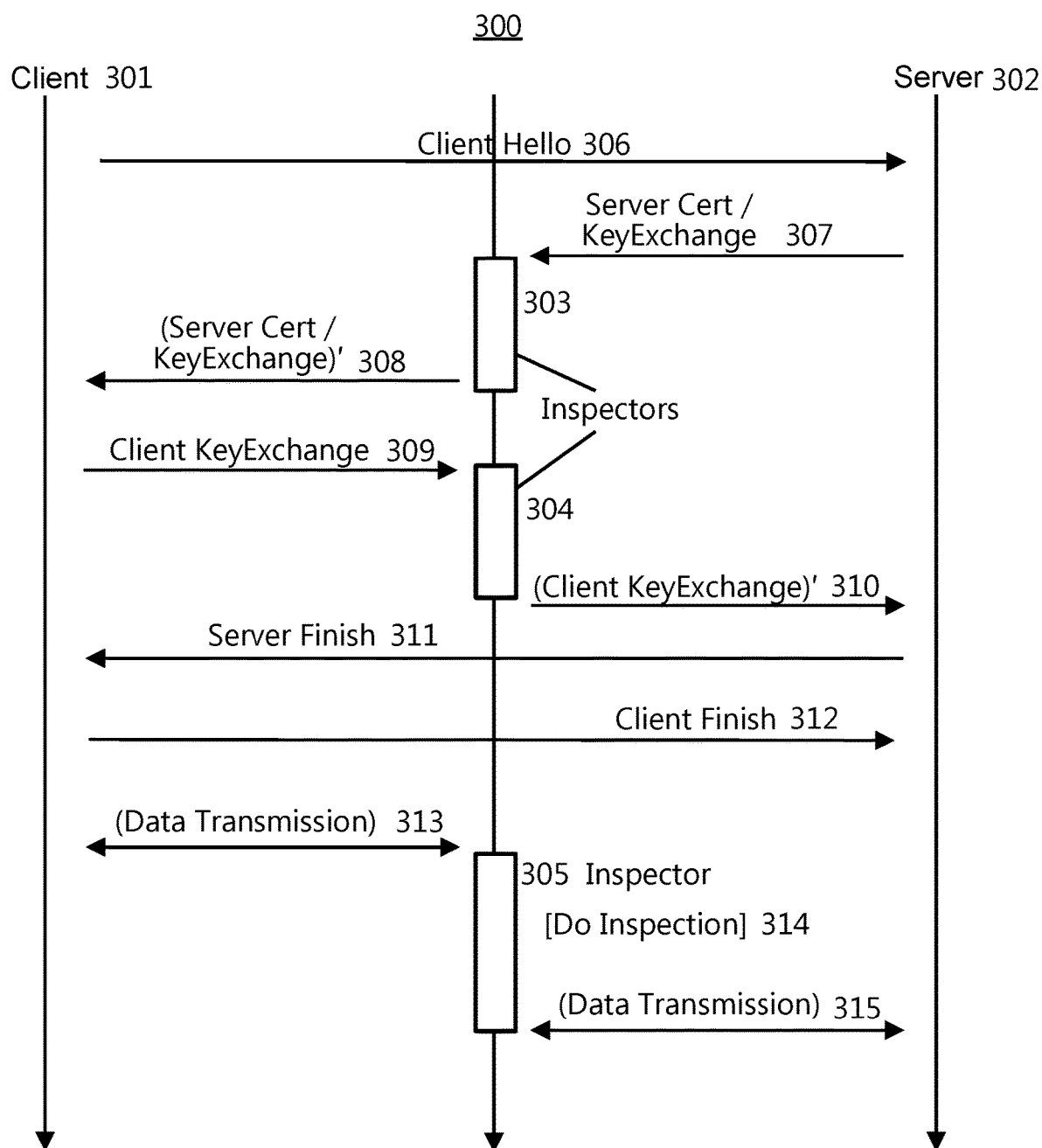
FIG. 3 depicts MitM inspection according to embodiments described herein.

FIG. 3 depicts MitM inspection according to embodiments of a stateless synchronization between TLS inspectors. Generally, the embodiments provide a means of providing stateless synchronization of public/private key-pairs between multiple inspectors and a means of doing active and passive MitM inspection. The use of key-pairs comprising of a public key and a private key is typically referred to as asymmetric encryption. Symmetric encryption on the other hand refers to the use of a single key for both encryption and decryption. In contrast, asymmetric encryption uses a different key (public and private) for encryption and decryption. When using symmetric encryption, users need to figure out how to synchronize the key, but asymmetric encryption works without any pre-shared information. The primary disadvantage of using symmetric encryption is that both parties have access to the secret key, but in asymmetric encryption, the secret key is known only by the owner (each party has a secret key). Asymmetric encryption, therefore, provides for improved security.

To do stateless synchronization, embodiments of the invention include inspectors that share a common mapping function algorithm, M, enabling each inspector to generate the session keys needed to perform inspection on data exchanged between a client and a server. The common mapping function algorithm enables stateless synchronization and obviates the need for synchronizing inspection states between inspectors. By using a common mapping function algorithm, each inspector generates an identical key-pair during the handshaking process (or key exchange). The common mapping function algorithm used by each inspector uses a shared key, which is used as the seed to generate random numbers. Inspectors exchange the shared key so that each inspector has the same seed. The frequency with which the shared key needs to be exchanged depends on the level of security desired, and the frequency can be predefined by user input, random or pseudo-random control, or other means. The more frequently the shared key is changed and exchanged among inspectors, the more secure the inspection process becomes. The actual means of exchanging the shared key is varied and may be dependent on the implementation of the inspectors. For example, in the embodiment in which each inspector is a separate instance within a larger software system, the system software can make the shared key available to each instance. In another example in which each inspector is part of physically separate hardware, the shared key can be exchanged through a variety of communication channels connected with the hardware. In yet another example, the shared key can be made available to a central repository accessible, for example, via the Internet, by each inspector.

The shared key and common mapping function algorithm enables the second inspector to do passive MitM inspection because both the first and second inspectors generate the same pre-master-secret to derive the session keys. Passive inspection means that no packet modification occurs. Other differences between active and passive MitM inspection include at least the following: (1) passive inspectors do not interfere with the TLS handshaking; and (2) passive inspectors do not send out any packets. Each inspector has many ways to identify it if it needs to perform active or passive inspection. A decision on whether to do active or passive inspection could be based on the client IP, server IP, server name, physical port number, and the like. For example, an inspector may inspect the physical port (e.g., eth0, eth1) to determine if it needs to perform active or passive inspection. Exemplary operation modes for the first and second inspectors include Active-Active and Active-Passive.

The common mapping function algorithm, M, can be defined as follows:

$$M(\text{key parameters}) = \text{keygen}(\text{hash}(\text{key parameters} + \text{inspector-shared-secret}))$$

Each key-pair is calculated from key parameters associated with a specific TLS session plus the inspector-shared secret, so each TLS session is independent. Because each key-pair calculation is independent, the order of the sessions will not affect the result.

Using the function M, each inspector could generate the following messages, for example:

$$(\text{Server Key Exchange})' = \text{GenKeyExchange}(M(\text{Server Key Exchange}))$$

$$(\text{Client Key Exchange})' = \text{GenKeyExchange}(M(\text{Client key Exchange}))$$

$$(\text{Server Public Key})' = \text{GenPubKey}(M(\text{Server Public Key}))$$

These are but some exemplary messages that can be generated by using a common inspector-shared-secret with a key parameter. One of ordinary skill in the art will appreciate that use of the common mapping function algorithm M is not limited to the generation of the above examples.

FIG. 3 depicts a client-server flow chart 300 according to an embodiment of the invention. The client 301 sends to the server 302 a client hello message 306 comprising the cryptographic information described above such as the TLS version, encryption protocols, a random byte string used in subsequent calculations, and other optional information. In response, the server 302 responds with a "server hello" message 307. The client 301 receives a "fake" server hello message 308. The client 301 sends a client key exchange message 309. A "fake" client key exchange message 310 is sent to the server 302. A server finish message 311 is sent from the server 302 to the client 301, and the client 310 sends a client finish message 312 to the server 302.

The inspectors 303, 304, and 305 may reside (or be collocated) at the client 301 or server 302, within the network, at a proxy, or at any other point in the network such that the data may be intercepted and inspected. According to an embodiment of the invention, to inspect encrypted data of, for example, a TLS session, the inspectors 303, 304, and 305 use the common mapping function algorithm M to generate identical key-pairs that are used to build the pre-master-secret and generate a session key. The session keys used by the inspectors 303, 304, and 305 are identical. The inspectors 303, 304, and 305 are each able to inspect in step 314 data transmitted during a session between the client 301 and the server 302 in steps 313 and 315.

Thus, as depicted in FIG. 3, inspectors 303, 304, and 305 intercept data from the client 301 (or server 302) during a session, decrypt the data using identical session keys, inspect the data, encrypt the data using identical session keys, and then send the non-malicious data to the server 302 (or client 301). This process is described in more detail with respect to FIGS. 5 and 6 below.

Figure 4:
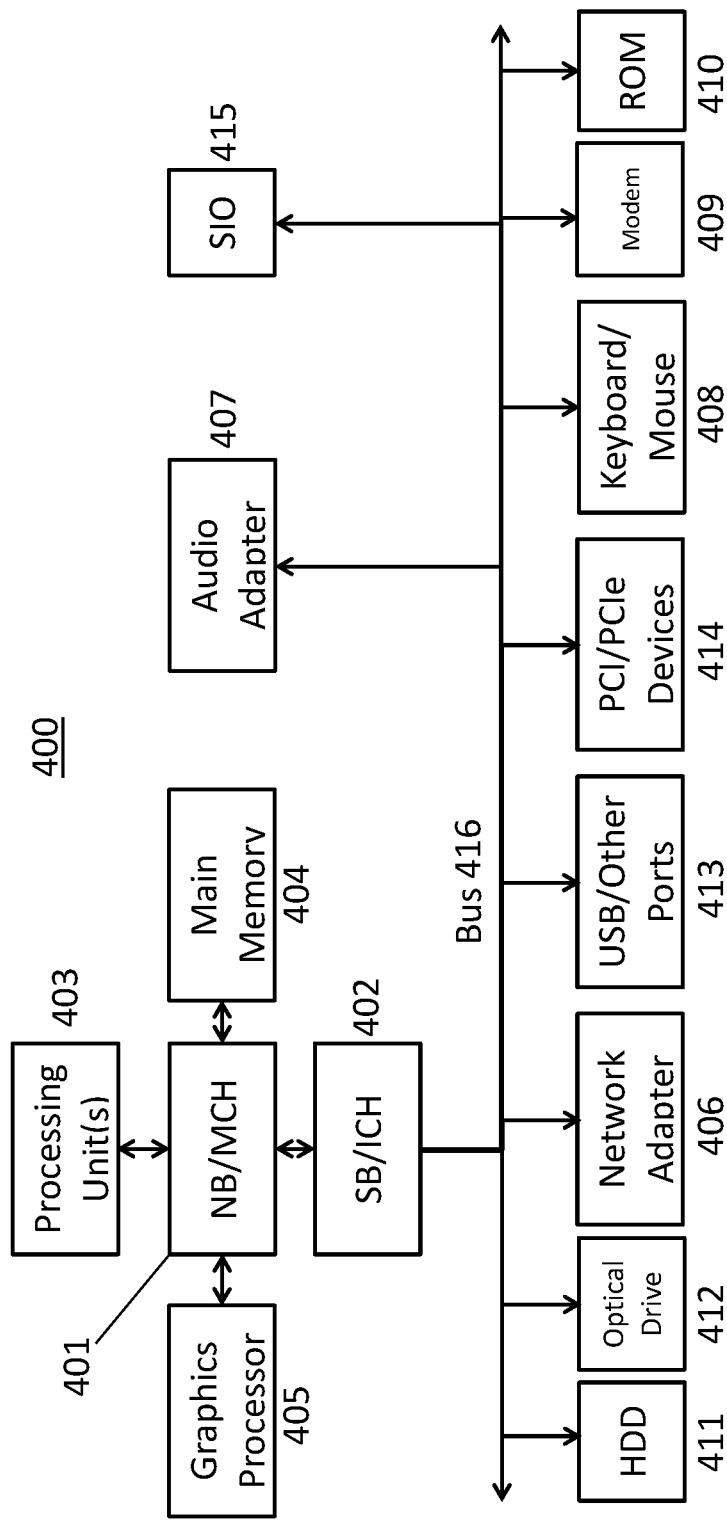
FIG. 4 is a block diagram of an example data processing system in which aspects of the illustrative embodiments may be implemented.

FIG. 4 is a block diagram of an example data processing system 400 in which aspects of the illustrative embodiments, such as the inspectors, can be implemented. Data processing system 400 is an example of a computer, such as a server or client, in which computer usable code or instructions implementing the process for illustrative embodiments of the present invention are located. In one embodiment, FIG. 4 represents a server computing device, such as a server, which implements the network tracking system described herein.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH 401 through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. The super I/O (SIO) device 415 can be connected to the SB/ICH 402.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System p® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the network tracking system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

Figure 5:
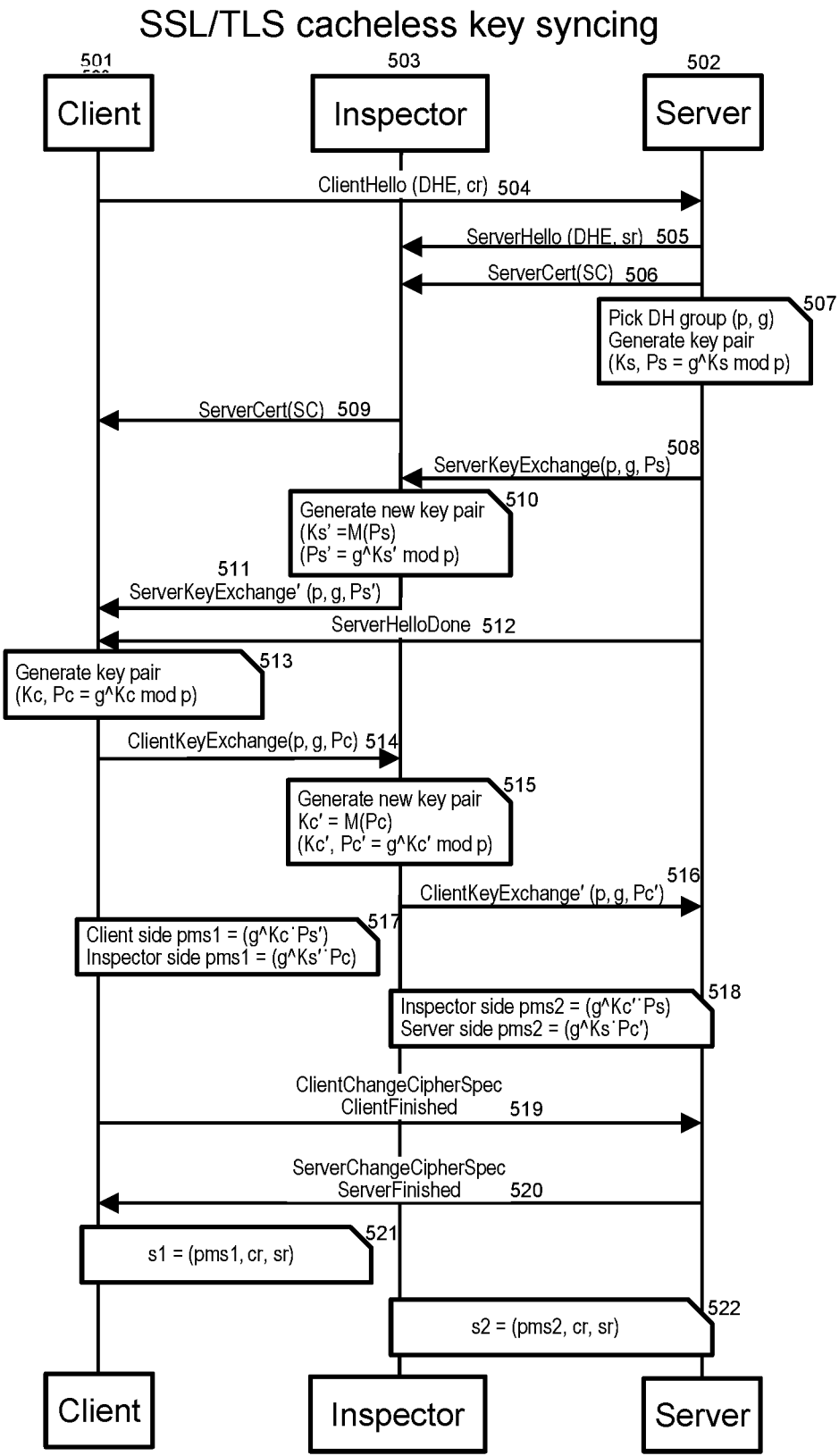
FIG. 5 depicts stateless TLS key synchronization according to embodiments described herein for a first inspector.
Figure 6:
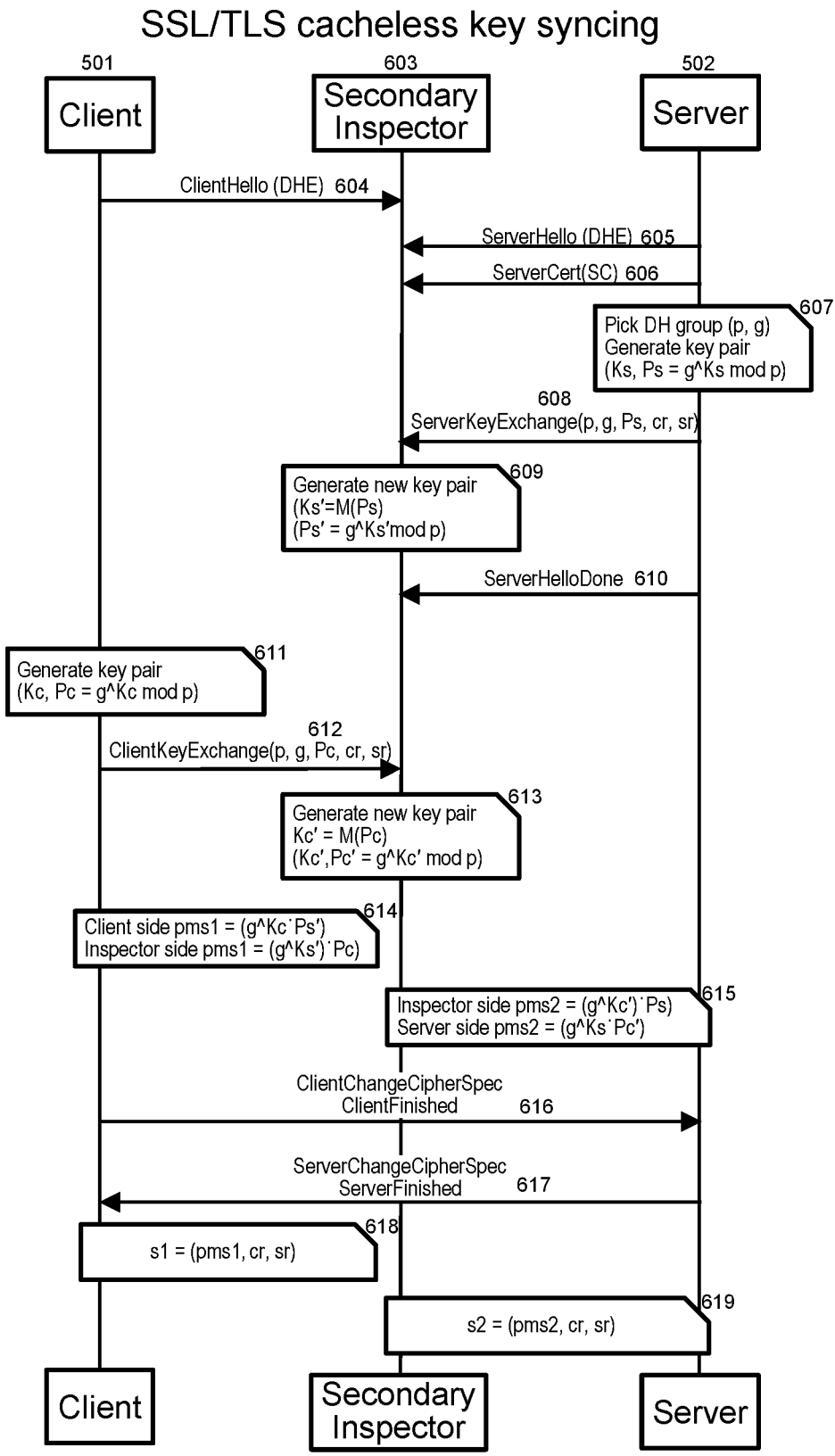
FIG. 6 depicts stateless TLS key synchronization according to embodiments described herein for a second inspector.

FIGS. 5 and 6 explain, in more detail, embodiments of the invention in which two (or more) inspectors can inspect the data of the same encrypted session. FIG. 5 depicts stateless TLS key synchronization according to embodiments described herein for a first inspector 503 of a TLS communications session between the client 501 and the server 502. FIG. 6 depicts the second inspector 603 for the same TLS communications session.

Referring to FIG. 5, the client 501 sends a ClientHello message 504 to the server 502. The ClientHello message 504 indicates to the server 502 that the available cryptography method is Diffie-Hellman Ephemeral (DHE). The clientHello message 504 also includes the client random byte string (cr).

In response to the client 501 initiating a TLS session with a Clienthello message 504, the server 502 sends a ServerHello message 505 and a ServerCert message 506 that are received by the first inspector 503. The ServerHello message 505 includes acknowledgement that DHE will be the cryptography format used. The ServerHello message 505 also includes the server random byte string (sr). The ServerCert 506 is the digital certificate from the server 502, which is used to authenticate the server 502. The first inspector 503 receives the ServerHello message 505 and the ServerCert 506. The first inspector 503 sends a ServerCert message 506 to the client 501 in step 509.

The server 502 generates a Diffie-Hellman key-pair in step 507 using prime modulus (p) and the primitive root modulo p (g). The server 502 generates a private key (Ks), and then calculates the public key (Ps) as follows:

$Ps = g^{Ks} \mod p$

The server 502 sends p, g, and Ps to the first inspector 503 as part of a ServerKeyExchange message 508.

In an embodiment, the first inspector 503 in step 510 utilizes a common mapping function algorithm M, as described above, to generate a first key-pair, comprising a "fake" private server key (Ks') and a "fake" public server key (Ps'). Ks' is generated using the public key from the server 502 (Ps) as follows:

$Ks' = M(Ps)$

The "fake" public server key(Ps') is generated using Ks' as follows:

$Ps' = g^{Ks'} \mod p$

The "fake" public server key is transmitted to the client 501 from the inspector 503 as part of a "fake" ServerKeyExchange' message 511. Also included in the ServerKeyExchange' message 511 are the values for p and g. The server 502 sends to the client 501 a ServerHelloDone message 512.

In step 513, the client 501 generates a Diffie-Hellman key-pair using p and g. The client 501 generates a private key (Kc), and then calculates the public key (Pc) as follows:

$Pc = g^{Kc} \mod p$

The client 501 sends p, g, and Pc to the first inspector 503 as part of a ClientKeyExchange message 514.

In step 515, the first inspector 503 generates a second key-pair. In an embodiment, the first inspector 503 utilizes a common mapping function algorithm M, as described above, to generate a "fake" private client key (Kc') using the public key from the client 501 as follows:

$Kc' = M(Pc)$

Then, a "fake" public client key(Pc') is generated using Kc' as follows:

$Pc' = g^{Kc'} \mod p$

The "fake" public client key is transmitted to the server 502 from the first inspector 503 as part of a "fake" ClientKeyExchange' message 516. Also included in the ClientKeyExchange' message 516 are the values for p and g.

The session key for the session between the client 501 and the inspector 502 is calculated by both the client 501 and the first inspector 503 using a pre-master-secret. As shown in step 517, the client 501 calculates the pre-master-secret it will use from the client private key and "fake" server public key as follows:

$pms1 = g^{Kc \cdot Ps'}$

The first inspector 503 calculates the pre-master-secret it will use from the "fake" private server key and public client key as follows:

$pms1 = g^{Ks' \cdot Pc}$

With the pre-master-secret as well as cr and sr, both the client 501 and the first inspector 503 can generate the session key used for bulk encryption/decryption of the payload between the client 501 and the first inspector 503, as shown in step 521.

Similarly, the session key for the session between the first inspector 503 and the server 502 is calculated by both the first inspector 503 and the server 502 using a pre-mastersecret. As shown in step 518, the first inspector 503 calculates the pre-master-secret it will use from the "fake" private client key and the public server key as follows:

$$pms2=g^{Kc'\cdot Ps}$$

The server 502 calculates the pre-master-secret it will use from the private server key and "fake" public client key as follows:

$$pms2=g^{Ks\cdot Pc'}$$

With the pre-master-secret as well as cr and sr, both the first inspector 503 and the server 502 can generate the session key used for bulk encryption/decryption of the payload between the first inspector 503 and the server 502, as shown in step 522.

The client 501 sends a ClientFinished message 519 to the server 502. The server 502 sends a ServerFinished messaged 520 to the client 501.

FIG. 6 depicts TLS key synchronization according to embodiments described herein for a second inspector of the TLS communications session between the client 501 and the server 502, previously discussed with regard to FIG. 5 describing the first inspector. A second inspector 603 receives a ClientHello message 604, which includes the available cryptography method of Diffie-Hellman Ephemeral (DHE). The second inspector 603 also receives a ServerHello message 605 and a ServerCert message 606. In step 607, the server 502 generates Ks and Ps key-pair as described with respect to step 507 in FIG. 5.

The ServerKeyExchange message 608 provides the second inspector 603 with the public server key (Ps), p, g, cr, and sr information. From this information, the second inspector 603 generates in step 609 a third key-pair including a "fake" private key and a public server key using the common mapping function algorithm M using the same inspector-shared-secret that was used by the first inspector 503. The "fake" private server key (Ks') is generated as follows:

$$Ks'=M(Ps)$$

Then, the "fake" public server key (Ps') is generated using Ks' as follows:

$$Ps'=g^{Ks'} \bmod p$$

A ServerHelloDone message 610 is sent from the server 502 to the second inspector 603.

The client 501 generates a key-pair Kc and Pc in step 611 as described with respect to step 513 in FIG. 5.

The client 501 sends p, g, Pc, cr, and sr to the second inspector 603 as part of a ClientKeyExchange message 612.

In step 613, the second inspector 613 generates a fourth key-pair. In an embodiment, the second inspector 603 utilizes the common mapping function algorithm M, as described above using the same inspector-shared-secret as the first inspector (e.g., inspector 503) to generate a "fake" private client key (Kc') using the public key from the client:

$$Kc'=M(Pc)$$

Then, a "fake" public client key(Pc') is generated using Kc' as follows:

$$Pc'=g^{Kc'} \bmod p$$

Because the second inspector 603 uses the same inspector-shared-secret as the first inspector 503, the first key-pair generated in step 510 and the third key-pair generated in step 609 are identical. Likewise, the second key-pair generated in step 515 and the fourth key-pair generated in step 613 are identical. Because the first inspector key-pairs are identical to the second inspector key-pairs, the second inspector 603 is able to generate identical session keys (in the same process as described with respect to the first inspector 503). This process begins in step 614 in which the pre-master-secret used by the client 501 and second inspector 603 is determined as set forth in step 517. In step 618, this pre-master-secret is used to generate the session key used for bulk encryption/decryption of the payload between the client 501 and the second inspector 603, as described with respect to step 521. The pre-master-secret used by the server 502 and second inspector 603 is determined in step 615 as described with respect to step 518. This pre-master-secret is used in step 619 to generate the session key used for bulk encryption/decryption of the payload between the second inspector 603 and the server 502, as described with respect to step 522.

The client 501 sends a ClientFinished message 616 to the server 502. The server 502 sends a ServerFinished messaged 617 to the client 501.

Using session keys that are identical to the session keys used by the first inspector 503, the second inspector 603 can, in the same session as the first inspector 503, passively inspect the payload transferred between the client 501 and the server 502. An inspector can be identified among other entities in a system by determining whether the entity-in-question is using the same or different session keys for the incoming and outgoing data channels. Inspectors, as disclosed in the present invention, use different session keys for the incoming data channel and outgoing data channel.

Furthermore, embodiments of the invention can be implemented in communication sessions other than those using TLS without departing from the scope of this invention. For example, an embodiment utilizing the IPSec security protocol and its associated encryption methods to secure network data is also contemplated.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement a system for providing stateless synchronization, the method comprising:
  receiving, by a first inspector device, a first set of key parameters while in a communication session;

generating, by the first inspector device, a first key-pair using the first set of key parameters and a shared key;

receiving, by the first inspector device, a second set of key parameters while in the communication session;

generating, by the first inspector device, a second key-pair using the second set of key parameters and the shared key;

receiving, by the first inspector device, a new shared key while in the communication session;

generating, by the first inspector device, a third key-pair using the first set of key parameters and the new shared key, wherein the new shared key is configured to be shared with the plurality of inspector devices inspecting the communication session; and generating, by the first inspector device, a fourth key-pair using the second set of key parameters and the new shared key.

2. The method as recited in claim 1, further comprising: receiving, by the first inspector device, the shared key while in the communication session.

3. The method as recited in claim 2, further comprising: wherein the first inspector device receives the shared key from a second inspector device inspecting the communication session.

4. The method as recited in claim 1, further comprising: wherein the new shared key is generated according to a predefined frequency.

5. The method as recited in claim 1, further comprising: generating, by the first inspector device, a new shared key while in the communication session; and transmitting, by the first inspector device, the new shared key to the plurality of inspector devices inspecting the communication session.

6. The method as recited in claim 1, further comprising: determining, by a first inspector device, a type of inspection.

7. The method as recited in claim 6, further comprising: wherein the type of inspection comprises passive or active inspection.

8. The method as recited in claim 6, further comprising: wherein the type of inspection is determined using one or more of the following:

client Internet protocol address, server Internet protocol address, server name, or port number.

9. A computer program product for providing stateless synchronization, the computer program product comprising a computer readable storage medium having program instructions embodied therewith, the program instructions executable by a processor to cause the processor to:

receive, by a first inspector device, a first set of key parameters while in a communication session;

generate, by the first inspector device, a first key-pair using the first set of key parameters and a shared key;

receive, by the first inspector device, a second set of key parameters while in the communication session;

generate, by the first inspector device, a second key-pair using the second set of key parameters and the shared key;

receive, by the first inspector device, a new shared key while in the communication session generate, by the first inspector device, a third key-pair using the first set of key parameters and the new shared key, wherein the new shared key is configured to be shared with the plurality of inspector devices inspecting the communication session; and generate, by the first inspector device, a fourth key-pair using the second set of key parameters and the new shared key.

10. The computer program product as recited in claim 9, wherein the program instructions further cause the processor to:

receive, by the first inspector device, the shared key while in the communication session.

11. The computer program product as recited in claim 10, further comprising:

wherein the first inspector device receives the shared key from a second inspector device inspecting the communication session.

12. The computer program product as recited in claim 9, further comprising:

wherein the new shared key is generated according to a predefined frequency.

13. The computer program product as recited in claim 9, wherein the program instructions further cause the processor to:

generate, by the first inspector device, a new shared key while in the communication session; and transmit, by the first inspector device, the new shared key to the plurality of inspector devices inspecting the communication session.

14. The computer program product as recited in claim 9, wherein the program instructions further cause the processor to:

determine, by a first inspector device, a type of inspection.

15. The computer program product as recited in claim 14, further comprising:

wherein the type of inspection comprises passive or active inspection.

16. A system for providing stateless synchronization, comprising:

A first inspector device including memory configured to:

receive a first set of key parameters while in a communication session;

generate a first key-pair using the first set of key parameters and a shared key;

receive a second set of key parameters associated with the communication session;

generate a second key-pair using the second set of key parameters and the shared key;

receive, by the first inspector device, a new shared key while in the communication session;

generate, by the first inspector device, a third key-pair using the first set of key parameters and the new shared key, wherein the new shared key is configured to be shared with the plurality of inspector devices inspecting the communication session; and generate, by the first inspector device, a fourth key-pair using the second set of key parameters and the new shared key.

* * * * *